United States Patent
Saeki et al.

(10) Patent No.: US 10,311,984 B2
(45) Date of Patent: Jun. 4, 2019

(54) SHAFT SEALING STRUCTURE AND REACTOR COOLANT PUMP

(71) Applicant: MITSUBISHI HEAVY INDUSTRIES, LTD., Tokyo (JP)

(72) Inventors: Kentarou Saeki, Tokyo (JP); Hidekazu Uehara, Tokyo (JP); Akihiko Umeda, Tokyo (JP); Masaru Sakai, Tokyo (JP); Hiroshi Kuzumi, Tokyo (JP); Yasuhiro Ikeda, Tokyo (JP); Toshihiko Matsuo, Tokyo (JP); Takanobu Otani, Tokyo (JP); Hiroomi Sakuma, Tokyo (JP); Hitoshi Ito, Tokyo (JP); Yasushi Takayama, Tokyo (JP); Tomoki Hanada, Tokyo (JP); Yuji Harada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 1043 days.

(21) Appl. No.: 14/421,722

(22) PCT Filed: Sep. 27, 2013

(86) PCT No.: PCT/JP2013/076299
§ 371 (c)(1),
(2) Date: Feb. 13, 2015

(87) PCT Pub. No.: WO2014/051068
PCT Pub. Date: Apr. 3, 2014

(65) Prior Publication Data
US 2015/0221400 A1    Aug. 6, 2015

(30) Foreign Application Priority Data

Sep. 28, 2012 (JP) .................................. 2012-216708
Feb. 13, 2013 (JP) .................................. 2013-025409

(51) Int. Cl.
*G21C 13/02* (2006.01)
*G21C 13/028* (2006.01)
(Continued)

(52) U.S. Cl.
CPC ............. *G21C 13/028* (2013.01); *F04D 7/08* (2013.01); *F04D 15/0209* (2013.01);
(Continued)

(58) Field of Classification Search
CPC F16J 15/16; F16J 15/184; F16J 15/185; F16J 15/186; F16J 15/3208;
(Continued)

(56) References Cited

U.S. PATENT DOCUMENTS 557,107 A * 3/1896 Clark ....................... F16J 15/32
    277/503
1,589,829 A * 6/1926 Andreassen .............. F16D 3/84
    277/503

(Continued)

FOREIGN PATENT DOCUMENTS

JP    56-041196 U    4/1981
JP    57-088295 A    6/1982
(Continued)

OTHER PUBLICATIONS

Extended European Search Report dated Jul. 24, 2015, issued in counterpart European Patent Application No. 13841561.7 (4 pages).
(Continued)

*Primary Examiner* — Kristina R Fulton
*Assistant Examiner* — L. Susmitha Koneru
(74) *Attorney, Agent, or Firm* — Westerman, Hattori, Daniels & Adrian, LLP

(57) ABSTRACT

The shaft sealing structure includes a seal ring that has abutment portions formed by dividing the seal ring along the axial direction and that is provided around a main shaft in a
(Continued)

ring-like manner; a support member that is provided in the seal ring along the circumferential direction of the main shaft; and a thermoswitch that is connected to the support member between the abutment portions and that presses the support member toward the center of the main shaft when the temperature rises to a temperature higher than that during normal operation, in which the seal ring is fixed at a position separated from the main shaft during the normal operation and is moved by the support member toward the center of the main shaft when the temperature rises to a temperature higher than that during the normal operation.

10 Claims, 20 Drawing Sheets

(51) Int. Cl.
*F16J 15/3272* (2016.01)
*F04D 7/08* (2006.01)
*F04D 15/02* (2006.01)
*F04D 29/14* (2006.01)
*F16J 15/00* (2006.01)
*F16J 15/02* (2006.01)
*F16J 15/16* (2006.01)
*F04D 29/58* (2006.01)

(52) U.S. Cl.
CPC ......... *F04D 29/146* (2013.01); *F04D 29/588* (2013.01); *F16J 15/008* (2013.01); *F16J 15/024* (2013.01); *F16J 15/164* (2013.01); *F16J 15/3272* (2013.01)

(58) Field of Classification Search
CPC .... F16J 15/3212; F16J 15/3216; F16J 15/322; F16J 15/54; F16J 15/3224
USPC ....... 277/503, 505, 508, 509, 589, 500, 331, 277/931, 929
See application file for complete search history.

(56) References Cited

U.S. PATENT DOCUMENTS

| | | | | |
|---|---|---|---|---|
| 1,915,677 | A * | 6/1933 | La Bour | F16J 15/30 277/503 |
| 2,488,968 | A * | 11/1949 | Devorss, Jr. | F16K 41/12 277/503 |
| 2,764,428 | A * | 9/1956 | Murphy | E21B 21/02 277/503 |
| 2,806,748 | A * | 9/1957 | Krotz | B63H 23/321 277/503 |
| 2,818,283 | A * | 12/1957 | Hutterer | F16J 15/40 277/503 |
| 3,333,855 | A * | 8/1967 | Andresen | F16J 15/30 277/503 |
| 4,408,768 | A * | 10/1983 | Novotny | F16J 15/34 277/505 |
| 4,795,170 | A * | 1/1989 | Kokkonen | F16J 15/187 277/504 |
| 5,076,589 | A * | 12/1991 | Marsi | F16J 15/006 277/319 |
| 5,217,232 | A * | 6/1993 | Makhobey | F16J 15/164 277/411 |
| 6,186,510 | B1 * | 2/2001 | Reagan | F16J 15/3452 277/371 |
| 6,371,488 | B1 * | 4/2002 | Szymborski | F04D 29/126 277/358 |
| 6,416,058 | B1 * | 7/2002 | Zygmunt | F16J 15/164 277/436 |
| 8,690,534 | B1 * | 4/2014 | Janocko | F16J 15/164 277/508 |
| 8,985,589 | B1 * | 3/2015 | Epshetsky | F16J 15/3276 277/551 |
| 2005/0012277 | A1 * | 1/2005 | Adrion | F16J 15/164 277/549 |
| 2007/0140877 | A1 * | 6/2007 | Sanville | F04D 7/08 417/423.11 |
| 2010/0150715 | A1 * | 6/2010 | Howard | F16J 15/164 415/230 |
| 2013/0140041 | A1 * | 6/2013 | Allen | E21B 23/06 166/387 |
| 2013/0170594 | A1 * | 7/2013 | Bass | G21D 1/04 376/203 |
| 2014/0271294 | A1 * | 9/2014 | Hawkins | F04B 7/00 417/510 |
| 2015/0192142 | A1 * | 7/2015 | Philippart | F04D 7/08 415/47 |
| 2016/0123310 | A1 * | 5/2016 | Hawkins | F03G 7/06 60/527 |

FOREIGN PATENT DOCUMENTS

| | | |
|---|---|---|
| JP | 58-024495 U | 2/1983 |
| JP | 05-306685 A | 11/1993 |
| JP | 11-351149 A | 12/1999 |
| JP | 2012-511680 A | 5/2012 |
| JP | 2013-209974 A | 10/2013 |
| WO | 2007/047104 A1 | 4/2007 |
| WO | 2010/068615 A2 | 6/2010 |

OTHER PUBLICATIONS

A Decision to Grant a Patent dated Sep. 6, 2016, issued in counterpart Japanese Patent Application No. 2013-025409, with English translation. An explanation of relevance states: "The Decision to Grant a Patent has been received". (3 pages).
International Search Report dated Oct. 22, 2013, issued in corresponding application No. PCT/JP2013/076299.
Written Opinion dated Oct. 22, 2013, issued in corresponding application No. PCT/JP2013/076299.
Westinghouse Electric Company, "Shield® Passive Thermal Shutdown Seal for Reactor Coolant Pumps", Nuclear Services/Field Services, Apr. 2011, www.westinghousenuclear.com, (2 pages).
Decision to grant European patent dated Jul. 21, 2016, issued in counterpart European Application No. 13841561.7.

* cited by examiner

SHAFT SEALING STRUCTURE AND REACTOR COOLANT PUMP

TECHNICAL FIELD

The present invention relates to a shaft sealing structure for preventing leakage of fluid in a pump and to a reactor coolant pump.

BACKGROUND ART

A pressurized-water reactor (PWR) used in a nuclear power plant is composed of a pressure vessel for containing nuclear fuel, a pressurizer, a steam generator for generating secondary steam, and a reactor coolant pump (RCP), etc. Through driving of the reactor coolant pump, coolant (fluid) flows in a cyclic path that connects the pressure vessel, the pressurizer, and the steam generator. Then, secondary steam generated at the steam generator drives a turbine, thereby generating electricity.

As a shaft sealing structure for a main shaft in the reactor coolant pump, three seals are provided in the axial direction on the circumference of the shaft, for example. As the seals, a first seal (No. 1 Seal), a second seal (No. 2 Seal), and a third seal (No. 3 Seal) are arranged in this order from an inner side of the pump toward an outer side thereof. Thus, in the reactor coolant pump, while the main shaft is rotated in a seal housing, sealing is achieved between the inside of a pump housing and the outside of the seal housing.

CITATION LIST

Patent Literature

{PTL 1} Japanese Translation of PCT International Application, Publication No. 2012-511680

SUMMARY OF INVENTION

Technical Problem

In the shaft sealing structure in the reactor coolant pump, coolant (pressurized water) at about 70° C. is reduced in pressure by the three seals, i.e., the first to third seals, from about 15 MPa to atmosphere pressure. Specifically, in the structure, the pressure of the pressurized water is reduced from about 15 MPa to about 0.3 MPa by the first seal and is reduced from about 0.3 MPa to about 0.05 MPa by the second seal.

However, it is assumed that the temperature of pressurized water that is about 70° C. during normal operation rises to about 300° C. during station blackout (SBO). At this time, pressurized water at about 300° C. and about 15 MPa reaches the second seal. Although the second seal is able to endure this pressurized water at about 300° C. and about 15 MPa for a long time, a technology for further improving the safety is demanded. For example, PTL 1 discloses a technology for a thermal shutdown seal for a rotary shaft, the seal surrounding a narrow annular fluid path.

The present invention has been made in view of such circumstances, and an object thereof is to provide a shaft sealing structure capable of lengthening the endurance time during which the leakage of fluid is prevented and a reactor coolant pump.

Solution to Problem

According to a first aspect, the present invention provides a shaft sealing structure for a pump, including: a seal ring that has abutment portions formed by dividing the seal ring along an axial direction and that is provided around a shaft in a ring-like manner; a supporting member that is provided in the seal ring along a circumferential direction of the shaft, that is moved toward a center of the shaft while being brought into contact with the seal ring, and that is moved relative to the seal ring along the circumferential direction of the shaft; and a first driving part that is connected to the supporting member between the abutment portions and that presses the supporting member toward the center of the shaft when the temperature rises to a temperature higher than that during normal operation, in which the seal ring is fixed at a position separated from the shaft during the normal operation and is moved by the supporting member toward the center of the shaft when the temperature rises to a temperature higher than that during the normal operation.

According to this structure, the seal ring provided around the shaft in a ring-like manner is fixed at a position separated from the shaft during normal operation. When the temperature of the first driving part rises to a temperature higher than that during normal operation due to a temperature rise of fluid in the pump, the first driving part connected to the supporting member in the abutment portions of the seal ring presses the supporting member toward the center of the shaft. At this time, the supporting member is moved toward the center of the shaft while being brought into contact with the seal ring and is moved relative to the seal ring along the circumferential direction of the shaft. Therefore, the seal ring is pressed by the first driving part via the supporting member and is moved toward the center of the shaft while narrowing the opening between the abutment portions. As a result, the seal ring is separated from the shaft without disturbing the rotation of the shaft during normal operation; however, in an abnormal state in which the temperature is rising, the clearance between the seal ring and the shaft is reduced to prevent a flow of fluid that could pass in the vicinity of the shaft in the pump, thus reducing or preventing leakage of fluid to the downstream side of the seal ring.

In the first aspect of the present invention, it is possible to further include a separating member that is sandwiched between the abutment portions of the seal ring to separate the seal ring from the shaft during the normal operation and that comes off the abutment portions of the seal ring when the seal ring is moved toward the center of the shaft.

According to this structure, during normal operation, the separating member is sandwiched between the abutment portions of the seal ring, and thus the seal ring is separated from the shaft. Then, when the temperature rises to a temperature higher than that during normal operation due to a temperature rise of fluid in the pump, the seal ring is pressed by the first driving part via the supporting member. Then, when the seal ring is moved toward the center of the shaft, the separating member comes off the abutment portions, thereby narrowing the opening between the abutment portions and further moving the seal ring toward the shaft.

In the first aspect of the present invention, the first driving part may fix the seal ring at a position separated from the shaft during the normal operation.

According to this structure, the seal ring is fixed by the first driving part at a position separated from the shaft during normal operation.

In the first aspect of the present invention, it is possible to further include a second driving part that is brought into contact with the seal ring in a vicinity of the abutment portions and that presses the seal ring toward the center of the shaft when the temperature rises to a temperature higher than that during the normal operation.

According to this structure, when the temperature of the second driving part rises to a temperature higher than that during normal operation due to a temperature rise of fluid in the pump, the second driving part brought into contact with the seal ring presses the seal ring toward the center of the shaft. As a result, compared with a case in which the seal ring is pressed by the first driving part alone, the force of pressing the seal ring against the shaft is increased, thereby making it possible to improve the sealability of the abutment portions of the seal ring and the sealability between the seal ring and the shaft.

In the first aspect of the present invention, the seal ring may be made of metal, and a material having a lower elastic modulus than the seal ring may be applied to a surface of the seal ring.

According to this structure, the surface of the seal ring is subjected to coating with a soft material having a low elastic modulus, for example, silver plating, synthetic resin coating, or rubber baking, thereby making it possible to improve the contact property when the seal ring is brought into contact with the shaft.

In the first aspect of the present invention, the material having a lower elastic modulus than the seal ring may be applied to, on a surface of the seal ring closer to the shaft, an area closer to a high-pressure side of the pump, and a metal part of the seal ring may be exposed in the remaining area.

According to this structure, the material having a lower elastic modulus than the seal ring is applied to, on the surface of the seal ring closer to the shaft, the area closer to the high-pressure side, between the metal part of the seal ring and the shaft, thus improving contact property when the seal ring is brought into contact with the shaft and reducing or preventing leakage of fluid from a scratch etc. on the surface of the shaft.

Furthermore, on the surface of the seal ring closer to the shaft, in the area closer to a low-pressure side, where the material having a lower elastic modulus than the seal ring is not applied, the metal part of the seal ring is exposed, so that the shaft and the metal part of the seal ring are brought into contact with each other. Thus, when the seal ring is pressed by fluid toward the downstream side, specifically, from the high-pressure side of the pump to the low-pressure side thereof, the metal part of the seal ring can reliably hold the seal ring. Furthermore, it is possible to prevent the material having a lower elastic modulus than the seal ring from protruding toward the low-pressure side of the pump.

In the first aspect of the present invention, the material having a lower elastic modulus than the seal ring may be applied to, on the surface of the seal ring, an area closer to a low-pressure side of the pump, and a metal part of the seal ring may be exposed in the remaining area.

According to this structure, the material having a lower elastic modulus than the seal ring is applied to, on the surface of the seal ring, the area closer to the low-pressure side, between the metal part of the seal ring and the shaft or a housing, thereby making it possible to improve the contact property when the seal ring is brought into contact with the shaft or the housing and to reduce or prevent leakage of fluid from a scratch etc. on the surface of the shaft or the surface of the housing.

In the first aspect of the present invention, a leakage preventing part having a lower elastic modulus than the seal ring may be installed between the abutment portions of the seal ring.

According to this structure, the leakage preventing part having a lower elastic modulus than the seal ring is installed between the abutment portions of the seal ring, thereby making it possible to improve the contact property between the abutment portions when the seal ring is brought into contact with the shaft and to reduce or prevent leakage of fluid.

In the first aspect of the present invention, the leakage preventing part may be reinforced by a material made of metal.

According to this structure, when the seal ring is pressed by fluid toward the downstream side, specifically, from the high-pressure side of the pump to the low-pressure side thereof, a metal part of the leakage preventing part holds a material having a lower elastic modulus than the seal ring, thereby making it possible to prevent the material having a lower elastic modulus than the seal ring from protruding toward the low-pressure side of the pump.

Furthermore, according to a second aspect, the present invention provides a reactor coolant pump including a shaft sealing structure according the above-described first aspect of the present invention.

According to this structure, the shaft sealing structure is provided, thereby making it possible to reduce or prevent leakage of fluid to a downstream side of the shaft sealing structure when the temperature rises.

Advantageous Effects of Invention

According to the present invention, it is possible to lengthen the endurance time during which the leakage of fluid is prevented.

DESCRIPTION OF EMBODIMENTS

A shaft sealing structure according to one embodiment of the present invention will be described below with reference to FIGS. 1 to 5.

Figure 2:
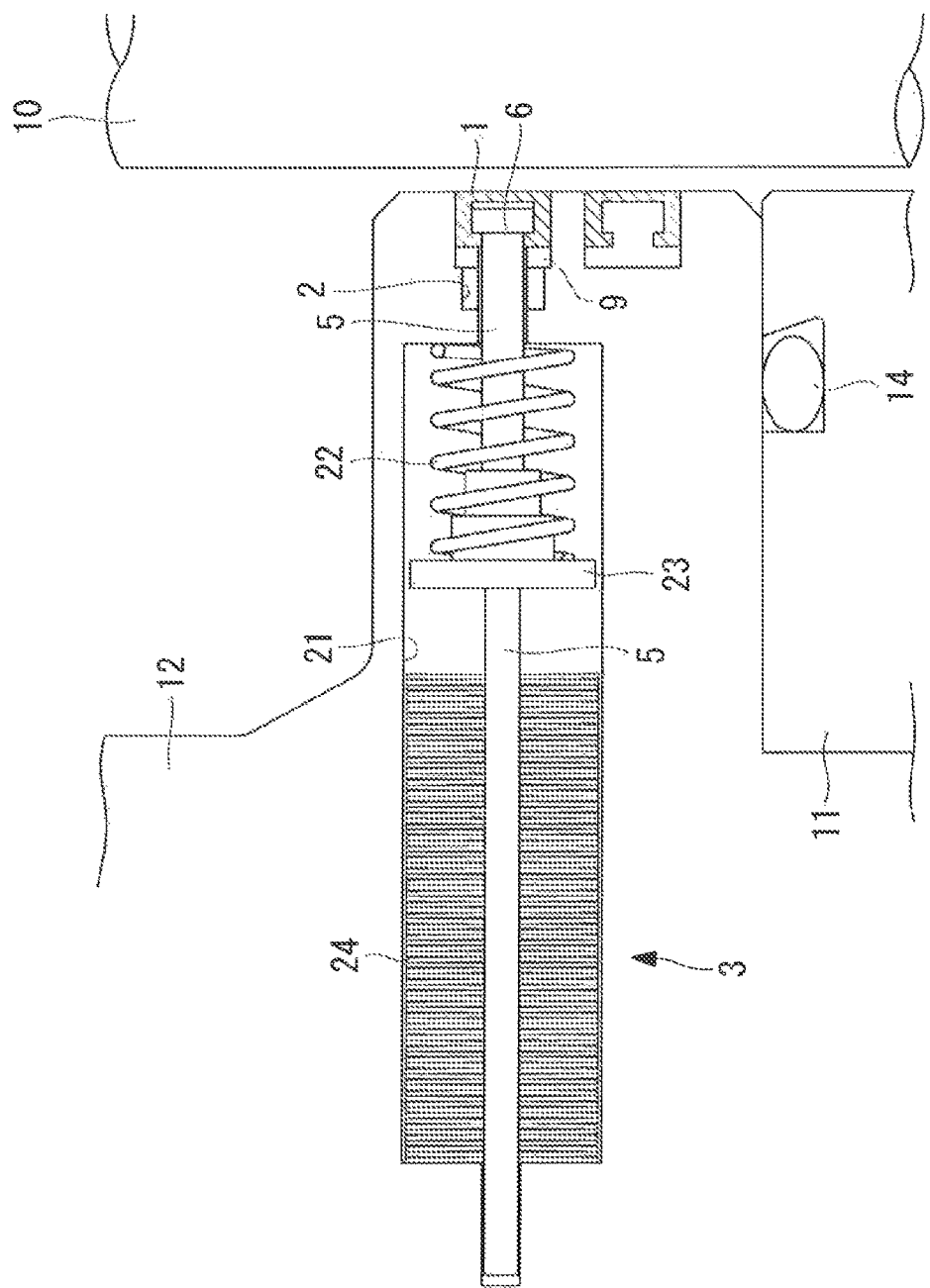
FIG. 2 is a longitudinal sectional view showing the leakage prevention seal in the shaft sealing structure according to the embodiment of the present invention, cut along the line II-II in FIG. 1.
Figure 4:
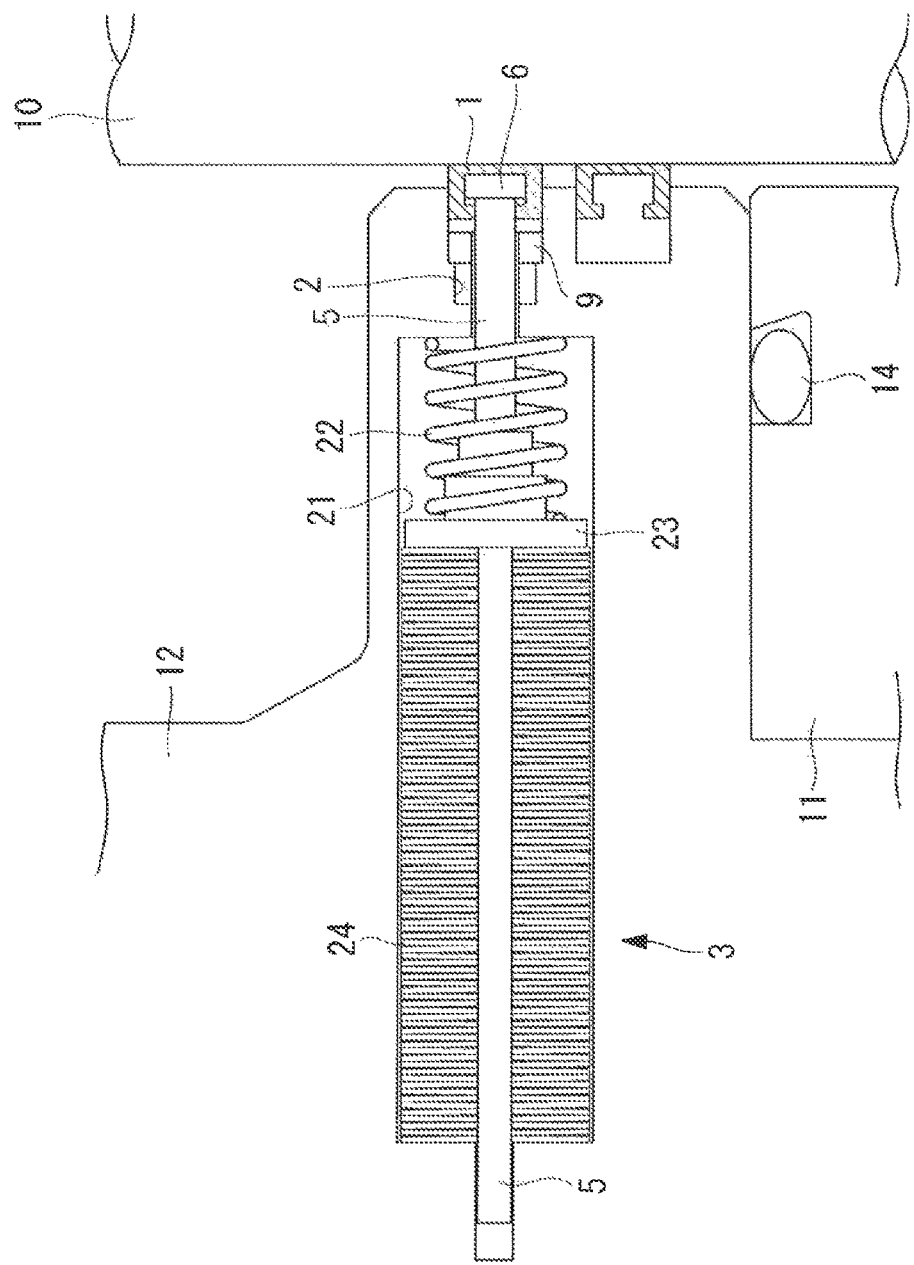
FIG. 4 is a longitudinal sectional view showing the leakage prevention seal in the shaft sealing structure according to the embodiment of the present invention.

The shaft sealing structure of this embodiment is applied, for example, to a reactor coolant pump of a pressurized-water reactor (PWR) used in a nuclear power plant. In the shaft sealing structure of the reactor coolant pump, a first seal (No. 1 Seal), a second seal (No. 2 Seal), and a third seal (No. 3 Seal) are arranged in this order from an inner side of the pump toward an outer side thereof. Members constituting the three seals are also collectively called a seal assembly. In this embodiment, a leakage prevention seal is further provided between the first seal and the second seal. In FIGS. 2 and 4, a lower side in the figure is an inner side of the pump, and the first seal is located below the leakage prevention seal of this embodiment. Furthermore, an upper side in the figure is an outer side of the pump, and the second seal is located above the leakage prevention seal.

The leakage prevention seal of this embodiment will be described below. With the leakage prevention seal, the seal safety can be further improved in a station blackout (SBO) situation.

Figure 1:
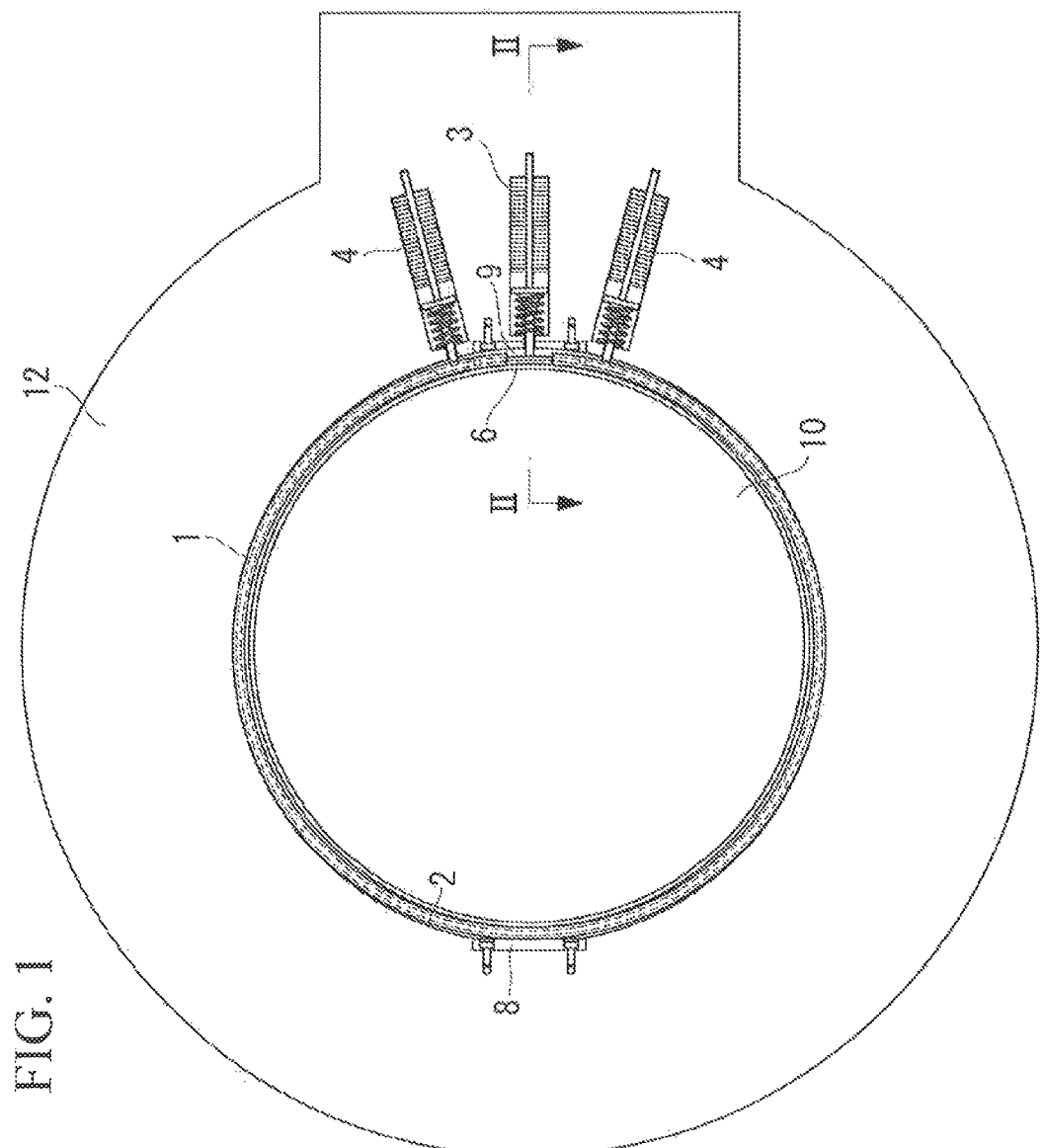
FIG. 1 is a transverse sectional view showing a leakage prevention seal in a shaft sealing structure according to one embodiment of the present invention.
Figure 3:
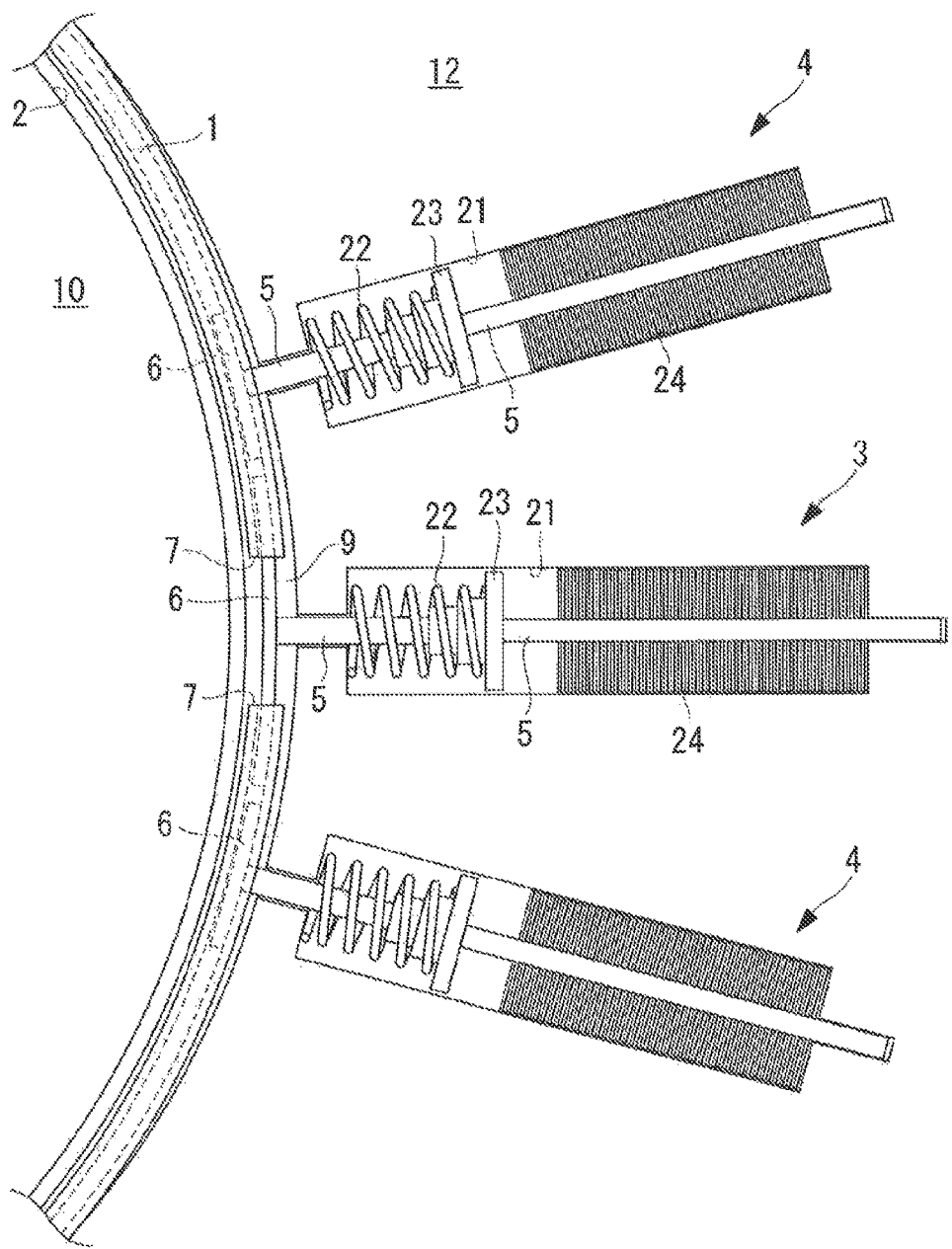
FIG. 3 is a transverse sectional view showing an enlarged part of the leakage prevention seal in the shaft sealing structure according to the embodiment of the present invention.

The leakage prevention seal is provided, in a seal housing in the shaft sealing structure of the reactor coolant pump (hereinafter, referred to as "pump"), on the circumference of a main shaft 10 so as to face the main shaft 10. As shown in FIGS. 1 to 3, the leakage prevention seal includes, for example, a seal ring 1, a seal-ring accommodating groove 2, a thermoswitch 3, and a support member 6.

The seal housing is a member provided around the main shaft 10 so as to face the main shaft 10 and is one component of the shaft sealing structure of the main shaft 10. As shown in FIG. 2, the seal housing is composed of a plurality of members, for example, seal-housing segmented members 11 and 12. The seal-housing segmented members 11 and 12 are coupled to each other with bolts, thus forming the integrated seal housing.

As shown in FIG. 2, a metal O-ring 14 is provided between the seal-housing segmented members 11 and 12 so as to surround the main shaft 10. The metal O-ring 14 prevents leakage of fluid (coolant) outside the seal housing. During normal operation of the pump, a clearance is formed between the seal housing and the main shaft 10, and the main shaft 10 is smoothly rotated about the axis.

As shown in FIG. 1, the seal ring 1 is installed in the seal-ring accommodating groove 2 and is provided around the main shaft 10 in a ring-like manner. The seal-ring accommodating groove 2 is a groove having a concave shape in longitudinal section and is formed in the seal-housing segmented member 12 in a ring-like manner around the main shaft 10, for example.

Figure 5:
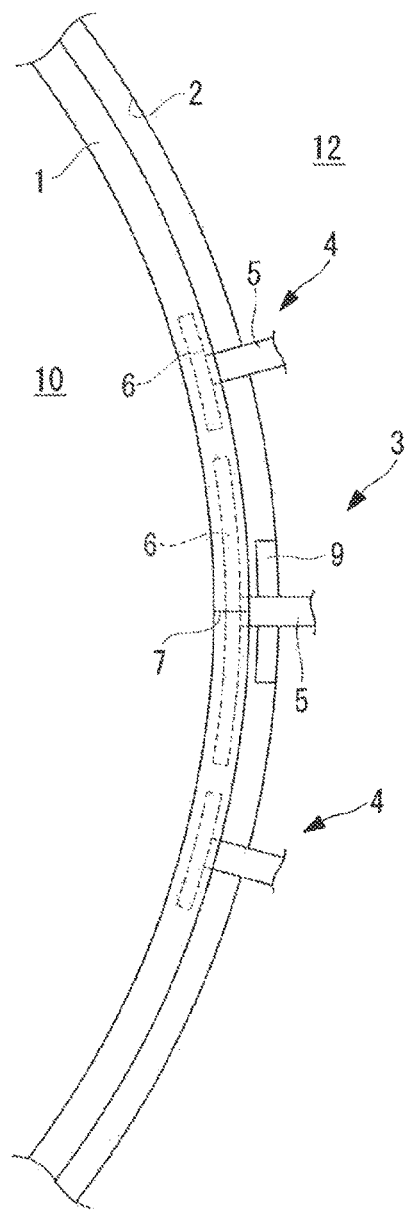
FIG. 5 is a transverse sectional view showing an enlarged part of the leakage prevention seal in the shaft sealing structure according to the embodiment of the present invention.

During normal operation, except for an abnormal event in which the temperature rises, the seal ring 1 is located at a position where the inner peripheral surface of the seal ring 1 is separated from the main shaft 10, as shown in FIGS. 1 to 3. On the other hand, when the temperature rises, the support member 6 is pressed by the thermoswitch 3 and is moved toward the main shaft 10, the seal ring 1 is moved toward the main shaft 10 together with the support member 6, and the inner peripheral surface of the seal ring 1 is brought into contact with the main shaft 10, as shown in FIGS. 4 and 5.

It is desirable that the seal ring 1 have corrosion resistance, sealability to contact surface when brought into contact with the main shaft 10, heat resistance during a temperature rise, pressure resistance during a pressure rise, and strength. Furthermore, it is desirable that the seal ring 1 have a low friction coefficient in consideration of a case where the seal ring 1 serves as a sliding surface when the main shaft 10 is normally rotated. The seal ring 1 is made of stainless steel, for example. Note that the surface of the seal ring 1 may be subjected to soft-material coating, for example, silver plating, synthetic resin coating, or rubber baking. Furthermore, instead of coating, a similar soft material may be inserted into the seal ring 1. Thus, the contact property when the seal ring 1 is brought into contact with the main shaft 10 or the seal housing can be improved.

Figure 6:
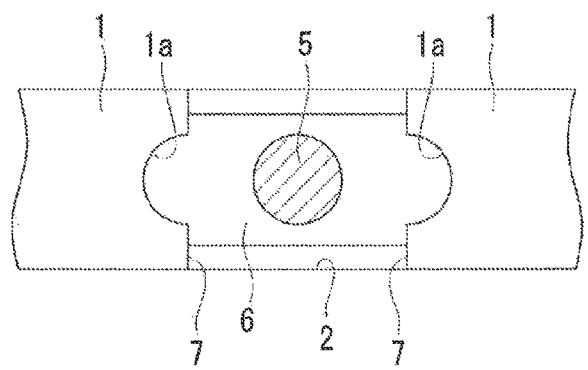
FIG. 6 is a lateral view showing a seal ring according to the embodiment of the present invention.
Figure 7:
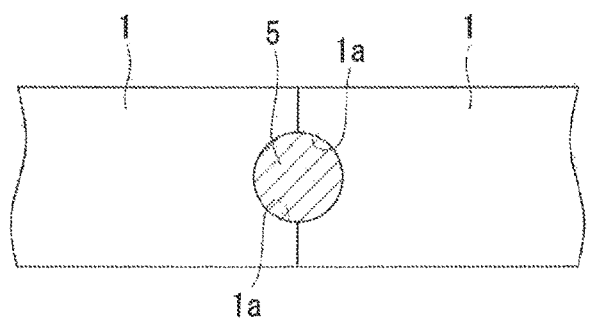
FIG. 7 is a lateral view showing the seal ring according to the embodiment of the present invention.

As shown in FIG. 2, the seal ring 1 has, for example, a square shape in longitudinal section, and at least a portion thereof into which the support member 6 is inserted is formed to have a hollow space. Furthermore, as shown in FIG. 6, at an outer side of the seal ring 1 (i.e., at an opposite side thereof from the main shaft 10 side thereof), notch grooves 1*a* are formed for a rod 5 of the thermoswitch 3. As shown in FIG. 7, when the seal ring 1 is closed, the notch grooves 1*a* sandwich the rod 5, thereby completely closing the inner peripheral surface of the seal ring 1, as shown in FIG. 5.

The seal ring 1 has a C-shape in cross section when cut in a direction perpendicular to the axial direction of the main shaft 10. The seal ring 1 has elasticity and is biased in such a direction so as to be tightened against the outer peripheral surface of the main shaft 10. The seal ring 1 has abutment portions 7 each having a shape obtained by cutting the seal ring 1 along the axial direction. Thus, as shown in FIG. 5, when the seal ring 1 comes off a stopper 9, the size of the opening between the abutment portions 7 of the seal ring 1 becomes zero, and the main shaft 10 and the seal ring 1 are brought into contact with each other.

The thermoswitch 3 is provided farther outward from the seal ring 1 in the radial direction of the main shaft 10. The thermoswitch 3 holds the rod 5, and a rise in temperature causes the rod 5 to protrude from the inside of the main body of the thermoswitch 3 toward the outside thereof. The tip end of the rod 5 moves toward the center of the main shaft 10. The thermoswitch 3 is, for example, a thermal actuator and may be metal bellows in which wax is enclosed, a bimetal, or a shape-memory alloy.

Here, the temperature at which the rod 5 of the thermoswitch 3 starts to move is determined in consideration of the temperature during SBO. For example, in a pressurized-water reactor (PWR), it is assumed that the temperature of fluid (pressurized water) that is about 70° C. during normal operation of the pump rises to about 300° C. during SBO. Thus, the thermoswitch 3 is driven during SBO and driving is completed when the temperature rises to about 150° C. or more, for example, so that protrusion of the rod 5 is completed.

The tip end of the rod 5 of the thermoswitch 3 is connected to the support member 6. Therefore, when the rod 5 moves toward the center of the main shaft 10, the support member 6 is also moved toward the center of the main shaft 10.

The thermoswitch 3 is installed at a portion where it is connected to the support member 6. Therefore, in a case where the abutment portions 7 of the seal ring 1 are provided at one place on the seal ring 1, and one support member 6 is provided for the abutment portions 7 provided at that one place, one thermoswitch 3 is installed for one seal ring 1.

Note that one or more thermoswitches 4 may be installed at each side of the thermoswitch 3. The tip end of each thermoswitch 4, that is, the tip end of a corresponding rod 5, is connected to a support member 6 different from that for the thermoswitch 3. Note that a support member 6 need not be provided at the tip end of the rod 5, so that the rod 5 may just have a simple bar-like shape. By installing the thermoswitches 4, the force of pressing the seal ring 1 toward the center of the main shaft 10 is increased. Furthermore, when the seal ring 1 is pressed against the outer peripheral surface of the main shaft 10, the force of closing the abutment portions 7 is increased, thus making it possible to enhance the sealability.

Furthermore, when a plurality of thermoswitches 3 and 4 are provided, even if one or more of the thermoswitches 3 and 4 are not driven due to a failure etc., the rest of the thermoswitches 3 and 4 can press the seal ring 1, thus improving the robustness.

Note that, when the thermoswitches 3 and 4 are connected to the same support member 6, if the thermoswitch 3 is not driven, there is a risk that the thermoswitches 4 cannot press the seal ring 1. Thus, as in this embodiment, each of the thermoswitches 3 and 4 presses the corresponding support member 6, thereby making it possible to reliably move the seal ring 1, without being influenced by driving of the other thermoswitches 3 and 4.

The support member 6 is a member having an arc-like shape, for example, and is provided along the circumferential direction of the main shaft 10 and the seal ring 1. An intermediate portion of the support member 6 is connected to the tip end of the rod 5 of the thermoswitch 3, in the seal ring 1. The support member 6 is inserted into the hollow space of the seal ring 1.

Furthermore, during normal operation, the support member 6 is brought into contact with wall portions of the inner wall of the seal ring 1 that are closer to the thermoswitch 3. On the other hand, when the thermoswitch 3 is driven, the support member 6 is brought into contact with a wall portion of the inner wall of the seal ring 1 that is closer to the main shaft 10. Thus, during normal operation, the support member 6 expands the seal ring 1 outward and fixes it. Furthermore, during a temperature rise, the support member 6 moves the seal ring 1 toward the center of the main shaft 10.

A spacer 8 is provided in the seal-ring accommodating groove 2 at an opposite side from the thermoswitch 3 with respect to the center of the main shaft 10. The spacer 8 reduces the depth of a portion of the seal-ring accommodating groove 2 to less than those of the other portions of the seal-ring accommodating groove 2. Thus, when the seal ring 1 is installed, the position of the seal ring 1 can be adjusted so as to be maintained in a predetermined position in the seal-ring accommodating groove 2. Furthermore, when the thermoswitch 3 presses the seal ring 1, movement of the entire seal ring 1 in the pressing direction is suppressed, thereby preventing a situation in which the seal ring 1 does not fit around the outer peripheral surface of the main shaft 10. Specifically, the movement of the entire seal ring 1 is suppressed by providing the spacer 8. Accordingly, it is possible to move the seal ring 1 toward the center of the main shaft 10 and to reliably fit the seal ring 1 around the outer peripheral surface of the main shaft 10.

As shown in FIGS. 1 to 3, the stopper 9 is fixed in the seal-ring accommodating groove 2, and, during normal operation, it is sandwiched between the abutment portions 7 of the seal ring 1. The radial length of the stopper 9 is formed such that, when the seal ring 1 is pressed by the thermoswitch 3 and is moved toward the center of the main shaft 10, and the abutment portions 7 come off the stopper 9, the opening between the abutment portions 7 of the seal ring 1 is closed.

During normal operation of the pump, in the seal ring 1, the stopper 9 is sandwiched between the abutment portions 7, as shown in FIG. 3, thereby forming an opening between the abutment portions 7 and making the radius of the seal ring 1 larger. On the other hand, when the seal ring 1 comes off the stopper 9 due to a temperature rise, the opening formed by the stopper 9 disappears from the seal ring 1, thus making the radius of the seal ring 1 smaller and bringing the seal ring 1 into contact with the main shaft 10.

Note that the stopper 9 is provided at a position corresponding to the abutment portions 7, specifically, at a position where the thermoswitch 3 is installed, and a hole through which the rod 5 of the thermoswitch 3 passes is formed in the stopper 9.

Next, the operation of the leakage prevention seal of this embodiment will be described.

During normal operation of the pump, the leakage prevention seal is in the state shown in FIGS. 1 to 3, the pressure of a pump chamber closer to the first seal is kept at about 15 MPa, and the pressure thereof closer to the second seal is kept at about 0.3 MPa. Furthermore, the fluid temperature is about 70° C. At this time, the abutment portions 7 of the seal ring 1 sandwich the stopper 9, and the rod 5 of the thermoswitch 3 is fixed at a position in the seal ring 1 away from the outer peripheral surface of the main shaft 10. Therefore, as shown in FIGS. 1 to 3, the seal ring 1 is located at a position separated from the main shaft 10, and a clearance is formed between the inner peripheral surface of the seal ring 1 and the main shaft 10. As a result, the main shaft 10 can be smoothly rotated about the axis.

The thermoswitch 3 is driven during SBO in the pressurized-water reactor (PWR). Then, the rod 5 starts to press the support member 6 toward the main shaft 10. As a result, the support member 6 is moved in the seal ring 1 toward the main shaft 10 to press the wall portion of the inner wall of the seal ring 1 closer to the main shaft 10. Then, the seal ring 1 is moved toward the center of the main shaft 10 together with the support member 6. When the seal ring 1 has been moved to some extent, the abutment portions 7 of the seal ring 1 come off the stopper 9. Then, as shown in FIGS. 4 and 5, when the seal ring 1 is further moved toward the center of the main shaft 10, the inner peripheral surface of the seal ring 1 is brought into contact with the main shaft 10. When the temperature rises to about 150° C. or more, for example, driving of the thermoswitch 3 is completed so that protrusion of the rod 5 is completed. As described above, according to this embodiment, leakage of fluid to the downstream side of the leakage prevention seal can be reduced or prevented.

In the conventional art, the second seal is able to endure pressurized water at about 300° C. and about 15 MPa for a long time. With the leakage prevention seal of this embodiment, the seal safety can be further improved in a station blackout (SBO) situation. Furthermore, because the seal ring 1 is made of stainless steel, the seal ring 1 has no problem with durability during normal operation or SBO.

Next, an example of the thermoswitch 3 of this embodiment will be described.

As shown in FIGS. 2 and 3, the thermoswitch 3 is installed in a thermoswitch accommodating part 21 and is provided with a spring 22, a moving plate 23, and a bimetal 24.

The thermoswitch accommodating part 21 is formed in the seal-housing segmented member 12, for example. A through-hole (not shown) through which the rod 5 passes and in which the rod 5 can move is formed at an end portion of the thermoswitch accommodating part 21 closer to the main shaft 10.

The plate-like moving plate 23 is fixed on the outer peripheral surface of the rod 5, and the moving plate 23 is moved in the axial direction of the rod 5 together with the rod 5. The spring 22 is a compression spring and is installed such that the spring 22 is sandwiched between the end portion of the thermoswitch accommodating part 21 closer to the main shaft 10 and the moving plate 23, one end of the spring 22 is brought into contact with the end portion of the thermoswitch accommodating part 21 closer to the main shaft 10, and the other end of the spring 22 is brought into contact with the moving plate 23. During normal operation of the pump, the spring 22 biases the moving plate 23 outward in the radial direction of the main shaft 10, thus expanding. As a result, the rod 5 is positioned at an outer side in the radial direction of the main shaft 10. On the other hand, when the rod 5 and the moving plate 23 are pressed by the bimetal 24 toward the center of the main shaft 10, the spring 22 is compressed between the end portion of the thermoswitch accommodating part 21 closer to the main shaft 10 and the moving plate 23.

Note that, in the present invention, the member that biases the moving plate 23 and is conversely compressed by the bimetal 24 is not limited to the spring 22, and another elastic member may be adopted.

The bimetal 24 is obtained by stacking a plurality of members having a disc-spring shape, for example, on top of each other in the axial direction of the rod 5. One end of the bimetal 24 is fixed to the thermoswitch accommodating part 21. The bimetal 24 is in a compressed state during normal operation, as shown in FIGS. 2 and 3, and expands to press the moving plate 23 toward the center of the main shaft 10 when the temperature rises, as shown in FIG. 4. As a result, the rod 5 is moved toward the center of the main shaft 10 together with the moving plate 23.

Note that, in the present invention, the member for pressing the moving plate 23 during a temperature rise is not limited to the bimetal 24, and another thermal actuator may be adopted. For example, metal bellows in which wax is enclosed or a shape-memory alloy may be adopted instead of the bimetal 24.

Note that, in the above-described embodiment, although a description has been given of a case in which only one leakage prevention seal having one seal ring 1 is installed, the present invention is not limited to this example case, and two or more leakage prevention seals may be installed in the axial direction. Thus, the robustness can be further improved. Furthermore, when two or more leakage prevention seals are actuated, the sealability is improved.

Next, a description will be given of a soft material to be applied to a surface of the seal ring 1.

Of the surfaces of the seal ring 1, a soft material 25 is applied to at least a surface 1a of the seal ring 1 that is closer to the main shaft 10, as shown in FIGS. 8 to 19, for example.

Figure 8:
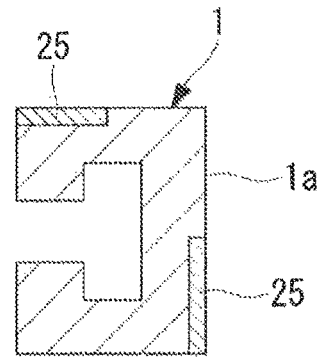
FIG. 8 is a longitudinal sectional view showing a modification of the seal ring according to the embodiment of the present invention.
Figure 9:
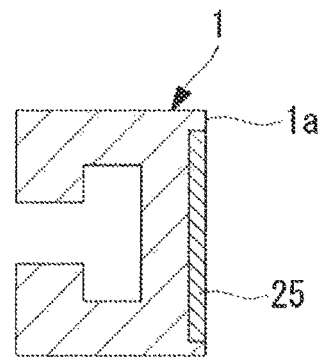
FIG. 9 is a longitudinal sectional view showing a modification of the seal ring according to the embodiment of the present invention.
Figure 10:
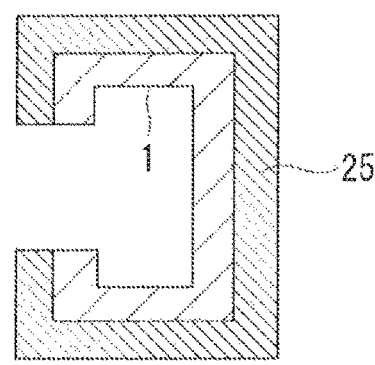
FIG. 10 is a longitudinal sectional view showing a modification of the seal ring according to the embodiment of the present invention.
Figure 11:
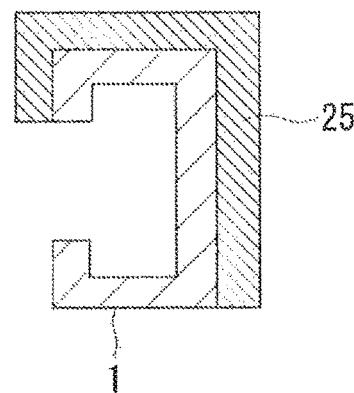
FIG. 11 is a longitudinal sectional view showing a modification of the seal ring according to the embodiment of the present invention.
Figure 12:
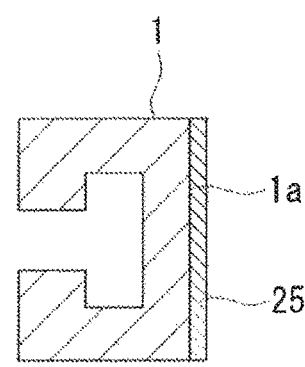
FIG. 12 is a longitudinal sectional view showing a modification of the seal ring according to the embodiment of the present invention.
Figure 13:
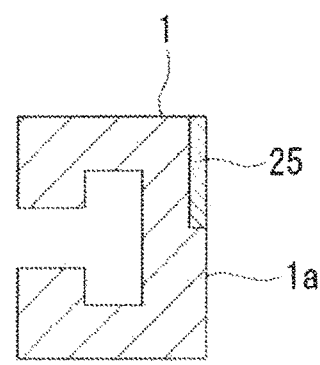
FIG. 13 is a longitudinal sectional view showing a modification of the seal ring according to the embodiment of the present invention.
Figure 14:
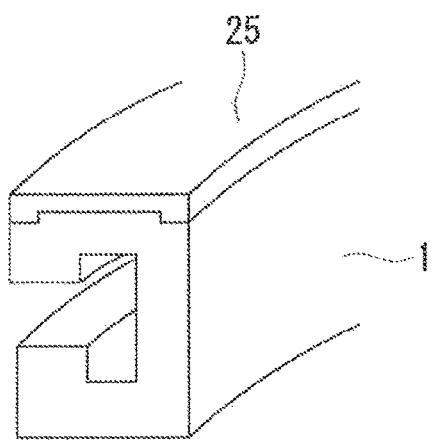
FIG. 14 is a longitudinal sectional view showing a modification of the seal ring according to the embodiment of the present invention.
Figure 15:
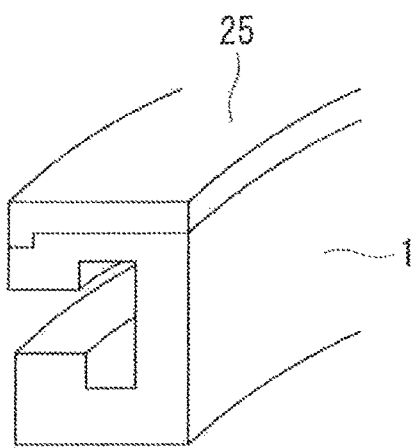
FIG. 15 is a longitudinal sectional view showing a modification of the seal ring according to the embodiment of the present invention.
Figure 16:
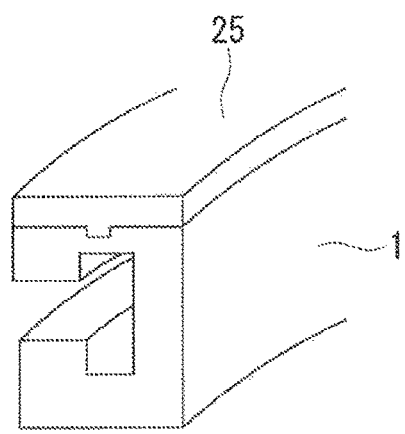
FIG. 16 is a longitudinal sectional view showing a modification of the seal ring according to the embodiment of the present invention.
Figure 17:
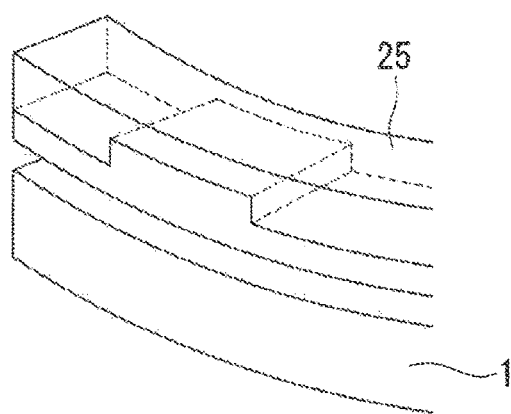
FIG. 17 is a longitudinal sectional view showing a modification of the seal ring according to the embodiment of the present invention.
Figure 18:
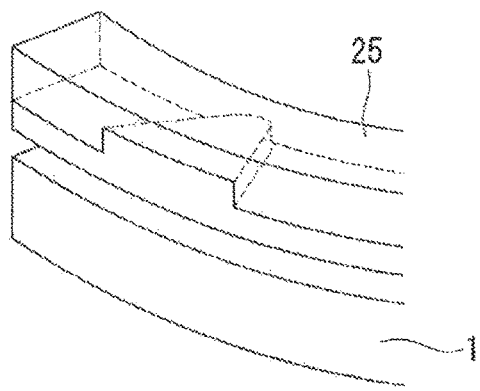
FIG. 18 is a longitudinal sectional view showing a modification of the seal ring according to the embodiment of the present invention.
Figure 19:
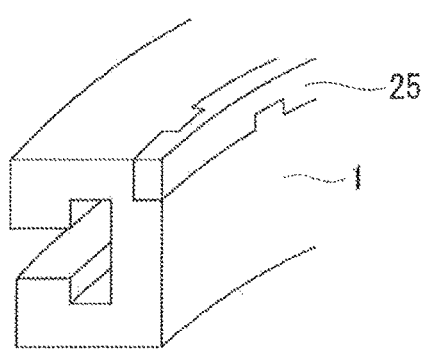
FIG. 19 is a longitudinal sectional view showing a modification of the seal ring according to the embodiment of the present invention.

As shown in FIGS. 8 and 9, on the surface 1a of the seal ring 1, which is closer to the main shaft 10, the soft material 25 may be applied to an area closer to a high-pressure side of the pump (an inner side of the pump) (the lower side in the figures), and a metal part of the seal ring 1 may be exposed in the remaining area, specifically, the area closer to a low-pressure side of the pump (the upper side in the figures).

Thus, the soft material 25 is applied to, on the surface of the seal ring 1 closer to the main shaft 10, the area closer to the high-pressure side, between the metal part of the seal ring 1 and the main shaft 10, thereby improving the contact property obtained when the seal ring 1 is brought into contact with the main shaft 10 and reducing or preventing leakage of fluid from a scratch etc. on the surface of the main shaft 10.

Furthermore, as shown in FIGS. 8 and 9, because the metal part of the seal ring 1 is exposed in the area on the surface of the seal ring 1 closer to the main shaft 10, to which the soft material 25 is not applied, specifically, in the area on the surface of the seal ring 1 closer to the low-pressure side, the main shaft 10 and the metal part of the seal ring 1 are brought into contact with each other. Thus, when the seal ring 1 is pressed by fluid toward a downstream side, specifically, from the high-pressure side of the pump to the low-pressure side thereof, the metal part of the seal ring 1 is brought into contact with the main shaft 10, thus making it possible to reliably hold the seal ring 1. Furthermore, because the soft material 25 is applied to the area closer to the high-pressure side of the pump, it is possible to prevent a situation in which the soft material 25 protrudes toward the low-pressure side of the pump due to thermal deformation.

Furthermore, the present invention is not limited to the above-described example: as shown in FIGS. 10 to 19, the soft material 25 may be applied to, on the surface 1a of the seal ring 1, which is closer to the main shaft 10, an area closer to the low-pressure side of the pump, and the metal part of the seal ring 1 may be exposed in the remaining area.

In this case, to the area on the surface of the seal ring 1 closer to the low-pressure side, the soft material 25 is applied between the metal part of the seal ring 1 and the main shaft 10 or the seal-housing segmented member 12. As a result, it is possible to improve the contact property when the seal ring 1 is brought into contact with the main shaft 10 or the seal-housing segmented member 12 and to reduce or prevent leakage of fluid from a scratch etc. on the surface of the main shaft 10 or the surface of the seal-housing segmented member 12.

As shown in FIGS. 14 to 19, for example, the soft material 25 and the seal ring 1 may be provided with an engaging part to prevent misalignment in the radial direction or the circumferential direction of the main shaft 10.

Next, a shaft sealing structure according to another embodiment of the present invention will be described. The shaft sealing structure of this embodiment differs from that of the above-described embodiment in that a leakage preventing part 31 is installed between the abutment portions 7 of the seal ring 1. A detailed description of components identical to those in the above-described embodiment will be omitted.

Figure 20:
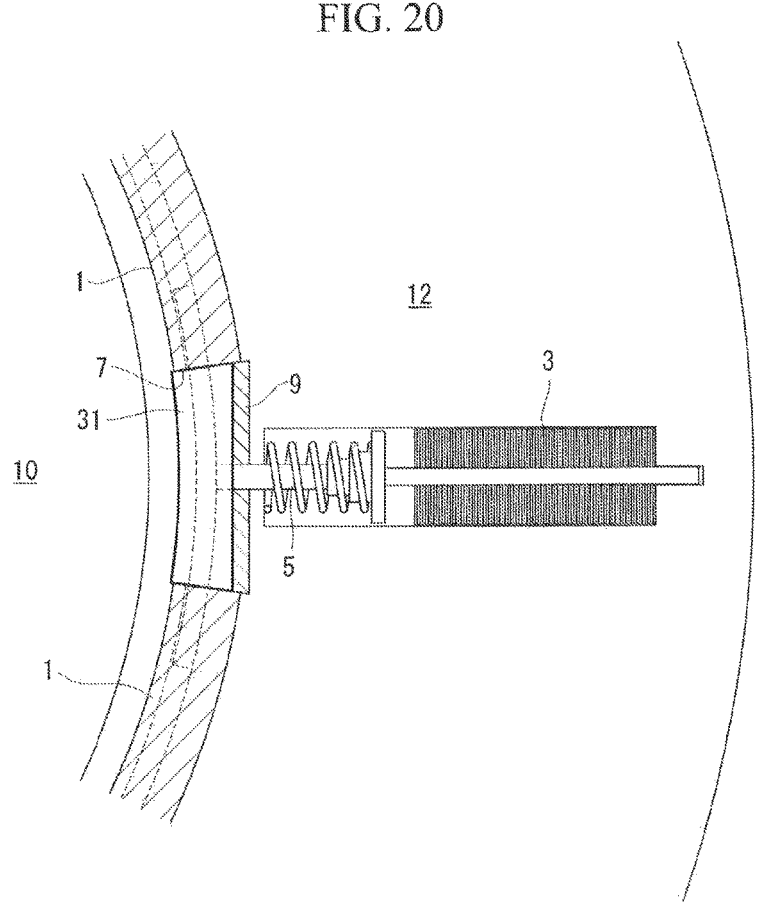
FIG. 20 is a transverse sectional view showing an enlarged part of a leakage prevention seal in a shaft sealing structure according to another embodiment of the present invention.

As shown in FIG. 20, the leakage preventing part 31 is installed between the abutment portions 7 of the seal ring 1.

The leakage preventing part 31 is made of a soft material, for example, soft metal, such as silver, synthetic resin, or rubber. The leakage preventing part 31 is coupled to both of ends of the seal ring 1, as shown in FIG. 20, for example. Furthermore, the leakage preventing part 31 is installed at the support member 6 and can be moved toward the outer peripheral surface of the main shaft 10 simultaneously with the movement of the support member 6.

Figure 21:
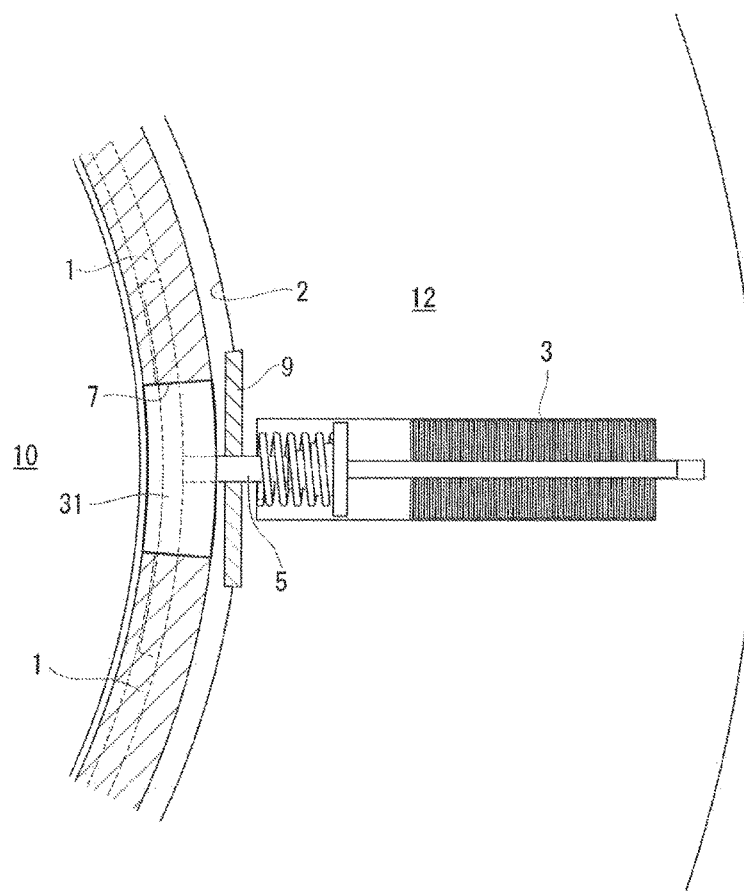
FIG. 21 is a transverse sectional view showing an enlarged part of the leakage prevention seal in the shaft sealing structure according to the other embodiment of the present invention.

At this time, the leakage preventing part 31 is deformed in accordance with expansion and contraction of the seal ring 1 because the leakage preventing part 31 has expandability/contractability. As a result, an opening formed between the abutment portions 7 that cannot be filled by the seal ring 1 alone, which is made of metal, can be filled, as shown in FIG. 21, for example. Therefore, the amount of leakage of fluid from the abutment portions 7 can be reduced.

In the case where the leakage preventing part 31 is not installed, if the materials of the seal ring 1 and the main shaft 10 are different, the circumferential length of the seal ring 1 during normal time is determined such that a clearance between the seal ring 1 and the main shaft 10 becomes 0 at a predetermined temperature during a temperature rise. Therefore, when the temperature rises to a temperature different from the predetermined temperature, the diameter of the main shaft 10 does not match the inner diameter of the seal ring 1, and the inner diameter of the seal ring 1 increases or decreases with respect to the diameter of the main shaft 10.

Furthermore, in a case where the leakage preventing part 31 is not installed, even if the materials of the seal ring 1 and the main shaft 10 are the same, when there is a difference in temperature therebetween due to the influence of heat capacity etc., a difference in thermal expansion is caused due to thermal expansion corresponding to the temperature. The diameter of the main shaft 10 does not match the inner diameter of the seal ring 1 at this time either, and the inner diameter of the seal ring 1 increases or decreases with respect to the diameter of the main shaft 10.

Figure 24:
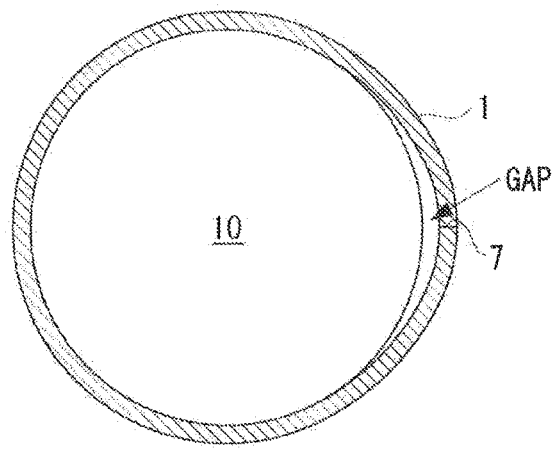
FIG. 24 is a transverse sectional view showing the relationship between a main shaft and the seal ring.
Figure 25:
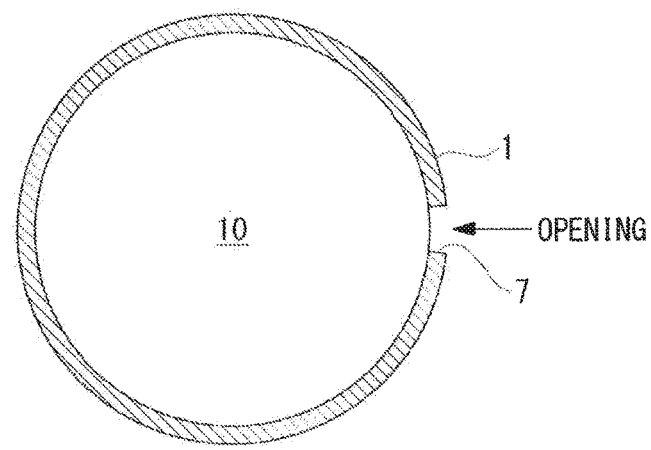
FIG. 25 is a transverse sectional view showing the relationship between the main shaft and the seal ring.
Figure 26:
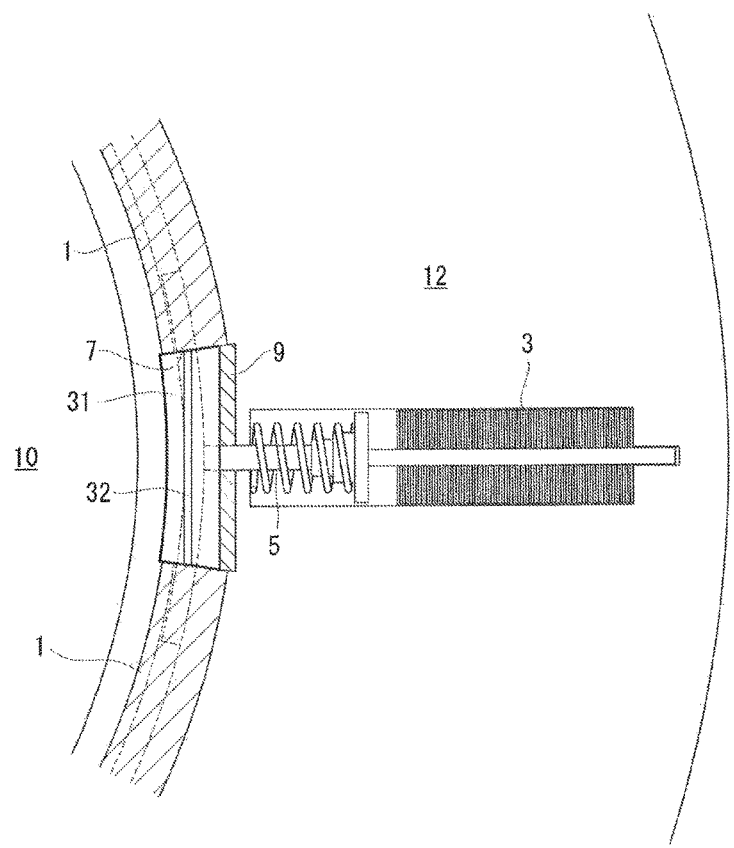
FIG. 26 is a transverse sectional view showing an enlarged part of a modification of the leakage prevention seal in the shaft sealing structure according to the other embodiment of the present invention.
Figure 27:
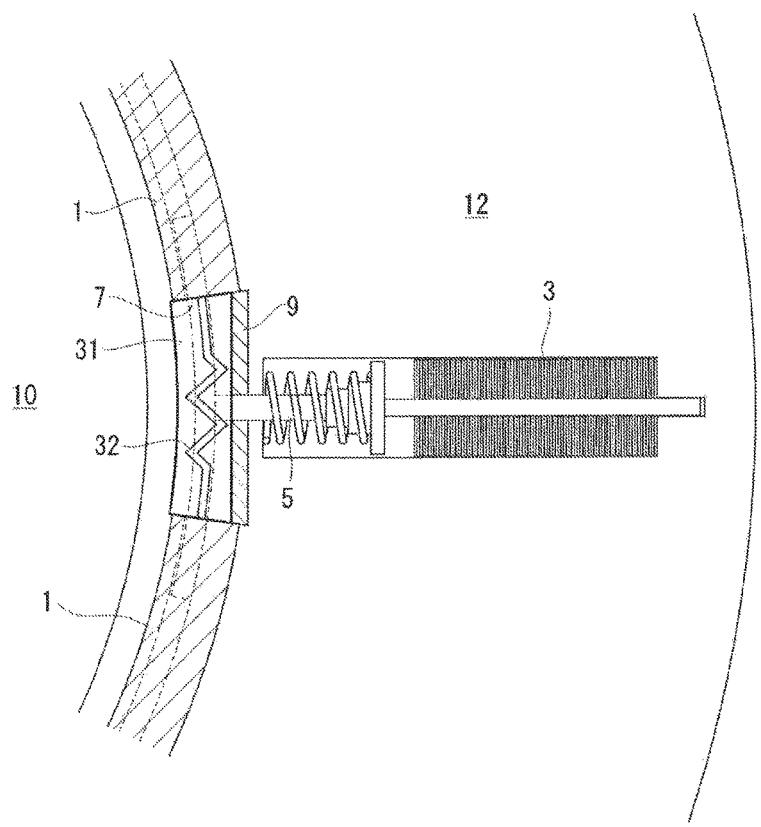
FIG. 27 is a transverse sectional view showing an enlarged part of a modification of the leakage prevention seal in the shaft sealing structure according to the other embodiment of the present invention.

For example, when the diameter of the main shaft 10 is smaller than the inner diameter of the seal ring 1, as shown in FIG. 24, both of ends of the seal ring 1 interfere with each other, thus causing a gap between the outer peripheral surface of the main shaft 10 and the inner peripheral surface of the seal ring 1. Furthermore, when the diameter of the main shaft 10 is larger than the inner diameter of the seal ring 1, an opening is formed between the abutment portions 7 due to a difference in circumferential length, as shown in FIG. 25.

On the other hand, according to this embodiment, the leakage preventing part 31 is installed, thereby making it possible to reduce in size or fill an opening between the abutment portions 7 formed due to a difference in thermal expansion between the seal ring 1 and the main shaft 10. As a result, the amount of leakage of fluid from the abutment portions 7 can be reduced.

Figure 22:
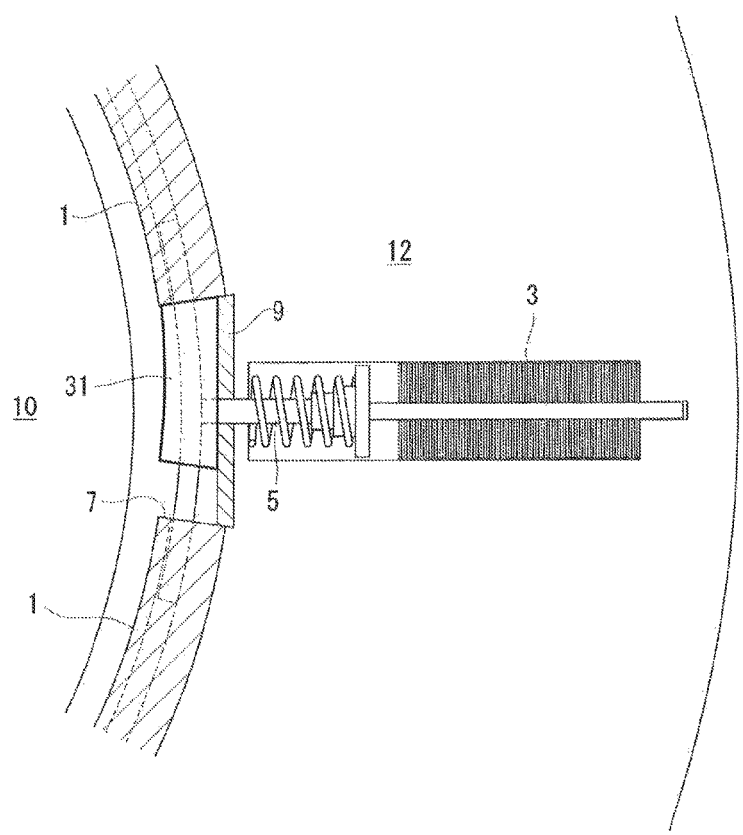
FIG. 22 is a transverse sectional view showing an enlarged part of a modification of the leakage prevention seal in the shaft sealing structure according to the other embodiment of the present invention.
Figure 23:
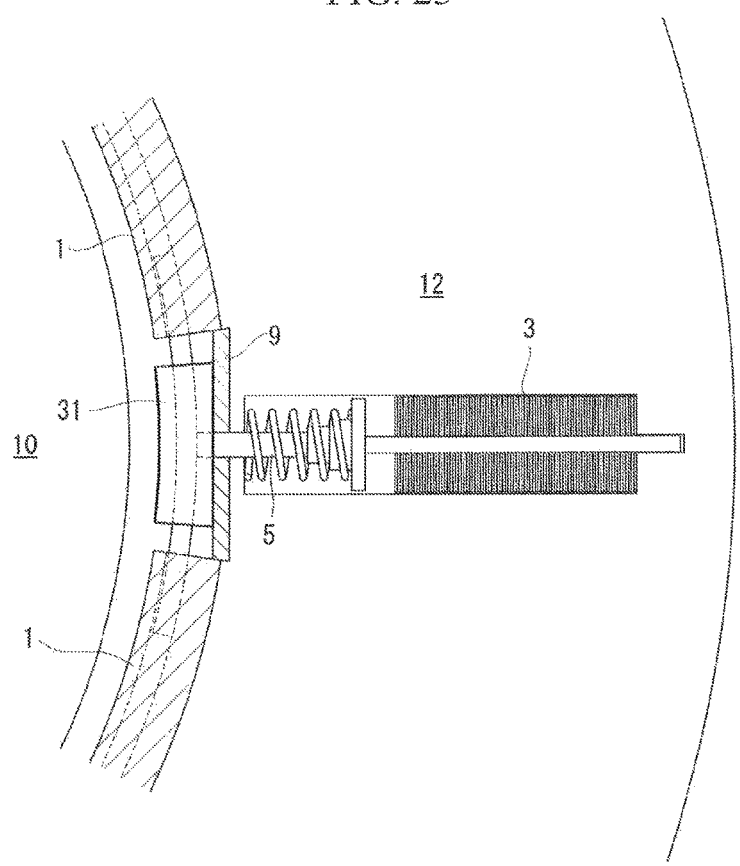
FIG. 23 is a transverse sectional view showing an enlarged part of a modification of the leakage prevention seal in the shaft sealing structure according to the other embodiment of the present invention.

Furthermore, the way of installing the leakage preventing part 31 of this embodiment is not limited to the case in which it is coupled to both of ends of the seal ring 1. For example, as shown in FIG. 22, the leakage preventing part 31 may be coupled to only one end of the seal ring 1. In this case, when the seal ring 1 is brought into contact with the outer peripheral surface of the main shaft 10, the leakage preventing part 31 is brought into contact with the other end of the seal ring 1. Furthermore, the leakage preventing part 31 may be coupled to neither end of the seal ring 1, as shown in FIG. 23. At this time, if the leakage preventing part 31 is installed at the support member 6, when the seal ring 1 is brought into contact with the outer peripheral surface of the main shaft 10, the leakage preventing part 31 is brought into contact with both of ends of the seal ring 1. In either of the examples shown in FIGS. 22 and 23, when the seal ring 1 is brought into contact with the outer peripheral surface of the main shaft 10, the state shown in FIG. 21 is produced.

Figure 29:
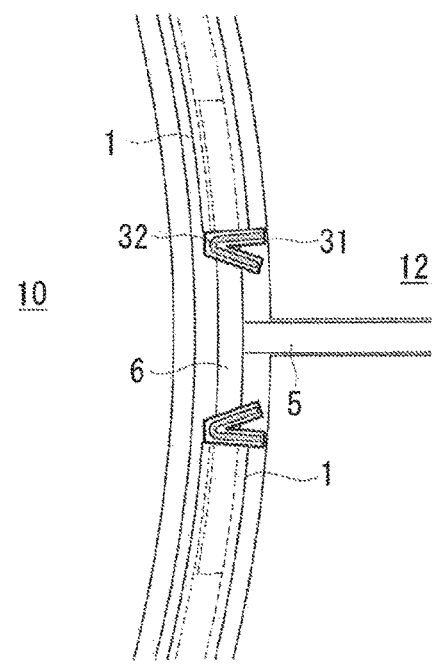
FIG. 29 is a transverse sectional view showing an enlarged part of a modification of the leakage prevention seal in the shaft sealing structure according to the other embodiment of the present invention.
Figure 30:
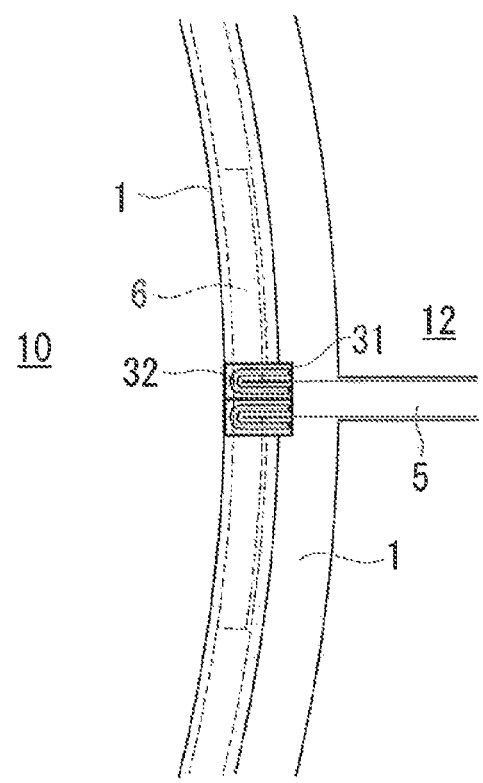
FIG. 30 is a transverse sectional view showing an enlarged part of a modification of the leakage prevention seal in the shaft sealing structure according to the other embodiment of the present invention.

Furthermore, the leakage preventing part 31 of this embodiment is not limited to a member having a straight shape provided along the circumferential direction of the main shaft 10. For example, the leakage preventing part 31 may have a V-shaped sealing structure, as shown in FIG. 29. FIG. 30 shows a state obtained after a leakage prevention seal shown in FIG. 29 moves. When the opening between the abutment portions 7 of the seal ring 1 is narrowed, leakage preventing parts 31 that are installed at both of ends of the seal ring 1 are brought into contact with each other.

Furthermore, the leakage preventing part 31 may be reinforced by a reinforcing member 32 that is made of a metal material, as shown in FIGS. 26, 27, 28, 29, and 30. The reinforcing member 32 has some degree of rigidity so as not to restrict compression deformation of the seal ring 1 and expansion or compression deformation of the leakage preventing part 31.

Figure 28:
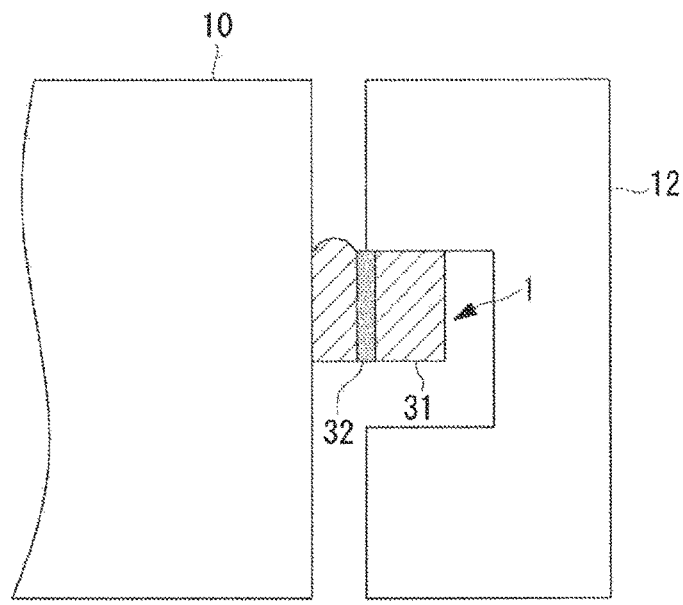
FIG. 28 is a longitudinal sectional view showing an enlarged part of a modification of the leakage prevention seal in the shaft sealing structure according to the other embodiment of the present invention.

Thus, when the seal ring 1 is pressed by fluid toward the downstream side, specifically, from the high-pressure side of the pump to the low-pressure side thereof, the reinforcing member 32 provided in the leakage preventing part 31 holds the soft material of the leakage preventing part 31, thus making it possible to prevent the soft material from protruding toward the low-pressure side of the pump or to reduce the amount of protruding soft material, as shown in FIG. 28.

REFERENCE SIGNS LIST

1 seal ring
2 seal-ring accommodating groove
3 thermoswitch (first driving part)
4 thermoswitch (second driving part)
5 rod
6 support member (supporting member)
7 abutment portions
8 spacer
9 stopper (separating member)
10 main shaft (shaft)
11, 12 seal-housing segmented members
14 metal O-ring
21 thermoswitch accommodating part
22 spring
23 moving plate
24 bimetal
25 soft material
31 leakage preventing part
32 reinforcing member

The invention claimed is:

1. A shaft sealing structure for a pump, comprising:
   an annular groove;
   a seal ring that has abutment portions each having a shape obtained by cutting the seal ring along an axial direction and that is installed with the abutment portions in the annular groove that is provided around a shaft in a ring-like manner;
   a supporting member that is provided in the seal ring along a circumferential direction of the shaft, that is moved toward a center of the shaft while being brought into contact with the seal ring, and that is moved relative to the seal ring along the circumferential direction of the shaft; and
   a first driving part that is connected to the supporting member between the abutment portions and that presses the supporting member toward the center of the shaft when the temperature rises to a temperature higher than that during normal operation,
   wherein the seal ring is fixed at a position separated from the shaft during the normal operation and is moved by the supporting member toward the center of the shaft when the temperature rises to a temperature higher than that during the normal operation.

2. A shaft sealing structure according to claim 1, further comprising a separating member that is sandwiched between the abutment portions of the seal ring to separate the seal ring from the shaft during the normal operation and that comes off the abutment portions of the seal ring when the seal ring is moved toward the center of the shaft.

3. A shaft sealing structure according to claim 1, wherein the first driving part fixes the seal ring at a position separated from the shaft during the normal operation.

4. A shaft sealing structure according to claim 1, further comprising a second driving part that is brought into contact with the seal ring in a vicinity of the abutment portions and that presses the seal ring toward the center of the shaft when the temperature rises to a temperature higher than that during the normal operation.

5. A shaft sealing structure according to claim 1, wherein the seal ring is made of metal, and a material having a lower elastic modulus than the seal ring is applied to a surface of the seal ring.

6. A shaft sealing structure according to claim 5, wherein the material having a lower elastic modulus than the seal ring is applied to, on a surface of the seal ring closer to the shaft, an area closer to a high-pressure side of the pump, and a metal part of the seal ring is exposed in the remaining area.

7. A shaft sealing structure according to claim 5, wherein the material having a lower elastic modulus than the seal ring is applied to, on the surface of the seal ring, an area closer to a low-pressure side of the pump, and a metal part of the seal ring is exposed in the remaining area.

8. A shaft sealing structure according to claim 1, wherein a leakage preventing part having a lower elastic modulus than the seal ring is installed between the abutment portions of the seal ring.

9. A shaft sealing structure according to claim 8, wherein the leakage preventing part is reinforced by a material made of metal.

10. A reactor coolant pump comprising a shaft sealing structure according to claim 1.

* * * * *